United States Patent [19]
Millauer et al.

[11] Patent Number: 5,296,314
[45] Date of Patent: Mar. 22, 1994

[54] CONTACT TERMINAL ARRANGEMENT IN A STORAGE BATTERY

[75] Inventors: Wolfgang Millauer, Munich; Manfred Spieth, Martingsried, both of Fed. Rep. of Germany

[73] Assignee: Hilti Aktiengesellschaft, Furstentum, Liechtenstein

[21] Appl. No.: 967,643

[22] Filed: Oct. 28, 1992

[30] Foreign Application Priority Data

Nov. 23, 1991 [DE] Fed. Rep. of Germany ....... 4138598

[51] Int. Cl.⁵ .................. H01M 6/44; H01M 14/00; H01M 2/10
[52] U.S. Cl. ...................................... 429/99
[58] Field of Search .............................. 429/178, 99

[56] References Cited

U.S. PATENT DOCUMENTS

| | | | |
|---|---|---|---|
| 1,073,107 | 9/1913 | Edison | 429/178 |
| 4,205,121 | 5/1980 | Naitoh | 429/99 |
| 4,346,151 | 8/1982 | Uba et al. | 429/99 |
| 4,576,880 | 3/1986 | Verdier et al. | 429/99 |
| 4,612,491 | 9/1986 | McCarty et al. | 429/99 |

Primary Examiner—David B. Springer
Attorney, Agent, or Firm—Anderson Kill Olick & Oshinsky

[57] ABSTRACT

A storage battery has an axially extending housing divided into axially extending blocks each containing a plurality of individual cells. The housing has a pair of plus-minus contact terminals equal to the number of blocks with the terminals accessible from the exterior of the housing. Voltage is supplied to each pair of terminals corresponding to the sum of the voltage of the cells within one block. The charging operation in the individual blocks is performed consecutively in an appropriately shaped charging device having a charging voltage corresponding to the voltage of one block. The voltage of the individual blocks can be utilized in series or in parallel connection by an appropriate electronic arrangement within an electrically driven tool.

6 Claims, 3 Drawing Sheets

CONTACT TERMINAL ARRANGEMENT IN A STORAGE BATTERY

BACKGROUND OF THE INVENTION

The present invention is directed to a storage battery with a coupling part for connection to a charging device with the coupling part having at least plus-minus terminal contact pair on its outer surface.

There are known electrically driven tools equipped with DC drive motors where the driving energy is provided in storage batteries. Such storage batteries made up of a number of individual cells can be connected to the housing of the electrically driven tool. The electrical connection of the storage battery with the electric tool is effected by suitable coupling parts. The mechanical mounting of the storage battery on the tool is attained by clamping, latching or snap-in elements.

A storage battery is disclosed in U.S. Pat. No. 4,576,880 where several individual cells are connected in series. Such an arrangement results in a storage battery voltage corresponding to the sum of the voltages of all of the individual cells. The interconnected individual cells are connected to a plus-minus pair of contacts located in an end region of the storage battery where they can be tapped from the outside.

A mechanical coding device is located in the coupling part, so that the known storage battery can be connected to electric tools with the same battery voltage or to the correct poles. Two springs are arranged in the housing of the storage battery and located opposite one another for preventing an improper contact connection of the plus-minus contact pair with the electric tool and also with a charging device.

Coding apparatus in wide use involves one or several springs disposed in the coupling part of the electric tool or the charging device and engageable into one or several grooves in the coupling part of the storage battery. There are other coding apparatus where the storage battery has at least one spring engaging into at least one groove in the electric tool or charging device. The coading apparatuses are intended to prevent the use of improper storage batteries.

A disadvantageous feature of plus-minus contact pairs disposed on the housing of the storage battery is that there are different manufacturers of storage batteries where the housings are similar as far as shape and housing cross-section is concerned, whereby they can be connected to electric tools and charging devices of other manufacturers. The contact pairs, however, may have terminals with different polarities.

If the polarity of the plus-minus contact pair of the storage battery is interchanged compared to the polarity of the plus-minus contact pair on the electric tools or charging devices, such a condition can lead to damage to the storage battery, the charging device or the electric tool. A damaged battery can no longer be charged. In the worst case the storage battery can explode due to a short-circuit.

SUMMARY OF THE INVENTION

Therefore, the primary object of the present invention, is to provide a storage battery having a contact terminal arrangement such that improper contact with the charging device or the electric tool is avoided and the safety of working personnel is assured.

In accordance with the present invention, the cross-sectional area of the coupling part is divided centrally or symmetrically into equal partial areas with one plus-minus pair of contacts within at least one partial area.

With the plus-minus contact pair within one partial area no faulty contacts can occur if the battery is connected with a charging device or an electric tool when it is turned through 180° in the circumferential direction of the axially extending housing.

Preferably, the storage battery has a coupling part with at least two partial areas each having a symmetrically arranged oppositely disposed plus-minus contact pair. The battery cells within the storage battery are normally aligned in series and connected electrically. By arranging several plus-minus contact pairs, the battery cells in the storage battery can be divided into several individual blocks with each block associated with a plus-minus contact pair which can be tapped on the exterior of the housing in the region of the coupling part.

The blocks can be designed in many ways. Further, the quantities of the individual cells within the individual blocks can differ. As a result, voltages of different magnitudes can be provided at the appropriate plus-minus contact terminal pairs.

In another embodiment, the quantity of the individual cells in each individual block can be equal. If such a storage battery is used with an electric tool, the regulation or control electronics can successively operate from the energy in the individual cells. For instance, a storage battery has two blocks each providing 12 V, then the energy can be used in two different ways by a control with an electronic arrangement installed in the electrically driven tool. With both blocks arranged in parallel, an electromotive force of 12 V with twice the capacity available for operating an electrically driven tool, that is, the tool can operate twice as long compared to one individual block with 12 V.

By connecting the blocks in series a voltage corresponding to the sum of the voltages in all of the blocks can be obtained. Where two blocks each of 12 V are arranged inside the storage battery, an electrically driven tool can be driven at a voltage of 24 V.

The contact terminals of the two plus-minus contact pairs are advantageously symmetrically arranged relative to the bisection or an axis of symmetry of the area forming two partial areas of equal size and with respect to a straight line extending perpendicularly to the line bisecting axis of symmetry of the total area and passing through the center of the surface area.

Due to the symmetrical arrangement of the plus-minus terminal contact pairs, the wiring of the individual blocks with the associated plus-minus contact pairs can be identical within the storage battery. These are considerable manufacturing advantages which affect the manufacturing costs of the storage battery.

Preferably, the charging device of the storage battery has a coupling part where the cross-sectional area of the coupling part is subdivided centrally or symmetrically into equal partial areas with a plus-minus terminal contact pair located within at least one of the partial areas.

Because of the disposition of the plus-minus terminal contact pair in one partial surface, it is not necessary to pay attention how the battery is oriented when it is inserted into the charging device. Since the plus-minus terminal contact pair is arranged in only one partial area, no improper contact can be established. In a preferred arrangement, a charging device has at least two partial areas each having one plus-minus pair of terminal contacts arranged centrally opposite one another.

By the central or symmetrical arrangement of the plus-minus terminal contact pairs, it is possible to charge a storage battery having at least one block. In such a charging device having a 12 V charging voltage, there is the advantage that it can be economically constructed with low cost components and with low voltage resistance requirements specified for the active components of the charging device.

The charging of the individual blocks of the storage battery is effected consecutively. If a charging device with only one single plus-minus pair of terminal contacts is available, then the battery must be removed from the charging device between each charging step or it must be separated from the coupling part of the charging device and turned around the axial direction until the next plus-minus pair of contacts with the battery are aligned opposite the plus-minus pair of the terminal contacts of the charging device. Next the battery is again connected to the charging device. The completion of the charging of one block can be indicated by a signal.

In so-called quick-charge devices, the central arrangement of the plus-minus terminal contact pairs is advantageous, since in the charging device with several plus-minus pairs exposed consecutively to 12 V charging voltage, care does not have to be taken how the battery is inserted into the coupling part charging device. The proper connection with the contact is always assured.

Preferably, the charging device is characterized in that the contact of two plus-minus pairs of terminal contacts are symmetrically arranged relative to the median dividing the partial areas of equal size and with respect to a straight line extending through a center of the partial areas and disposed perpendicular to the median.

Due to manufacturing reasons relative to the fabrication of the coupling part of the charging device, the above-mentioned symmetrical arrangement of the plus-minus pairs of terminal contacts is preferred.

This results in more uniformly distributed voltages during charging.

Two different charging devices are available affecting the charging duration of the storage batteries of equal capacity. The "normal" charging device differs from the "quick" charging device by having a charging period which is six times longer. The "normal" charging device can be manufactured more economically due to the simpler electrical components used.

Storage batteries suitable for use in "quick" charging devices have a different chemical construction than the batteries in "normal" charging devices. If a storage battery suitable for a "normal" charging device is inserted into a "quick" charging device it would result in damage to or explosion of the battery.

To prevent such an occurrence, it is possible to attach a blocking arrangement at the storage battery in the region of the coupling part for preventing the insertion of batteries suitable for "normal" charging devices into "quick" charging devices.

The charging device, however, must have the recess for accepting the blocking arrangement, whereby the storage battery can be inserted into the "normal" charging device. This feature does not impede the insertion of the battery for "quick" charging devices into a "normal" charging device.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

DETAILED DESCRIPTION OF THE INVENTION

Figure 1:
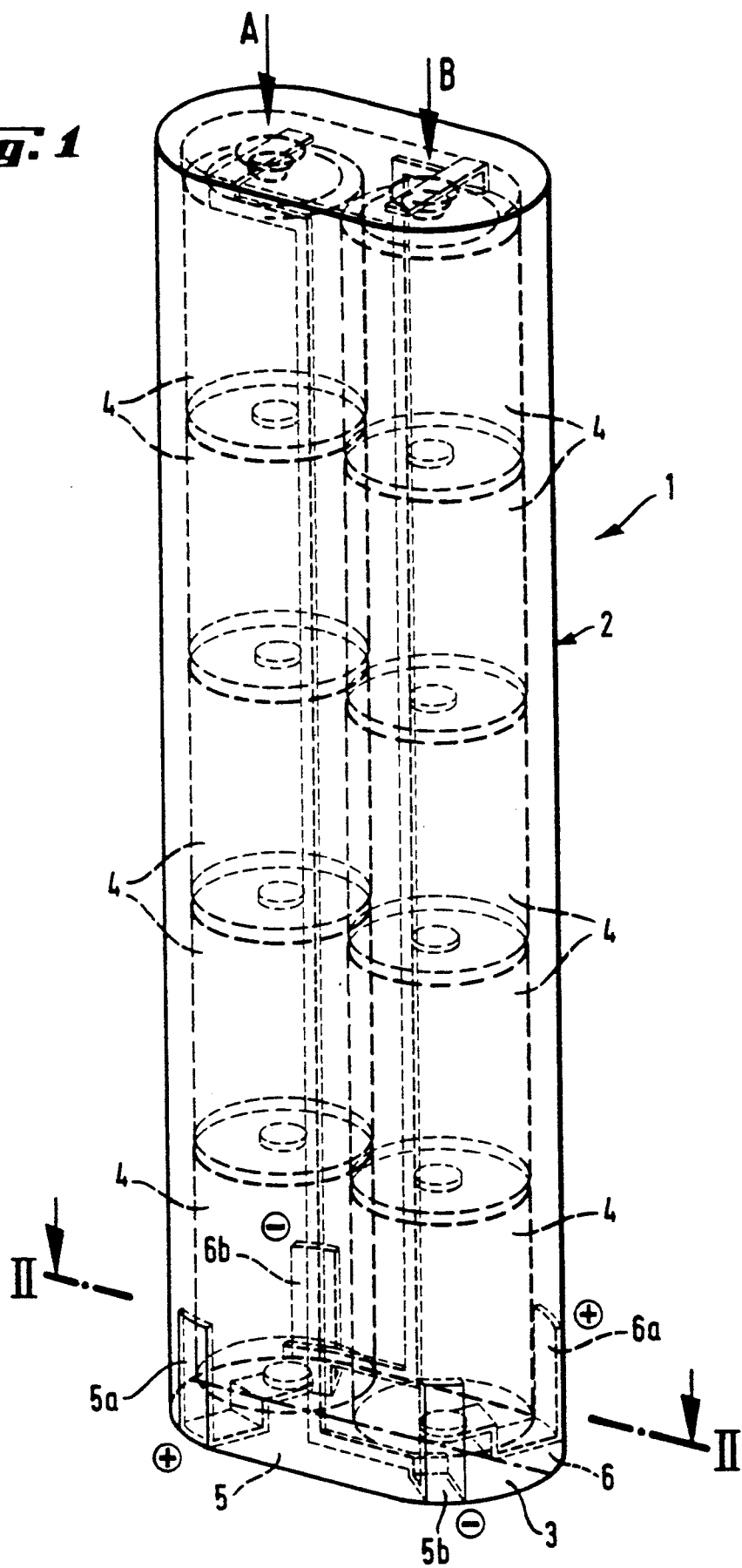
FIG. 1 is an elevational view in perspective of a storage battery, with two plus-minus contact terminal pairs, embodying the present invention.

In FIG. 1 an axially extending storage battery 1 has two blocks A, B each containing five individual cells 4 electrically connected in series in each block. The storage battery 1 has an axially extending housing 2 with a coupling part 3 at one end. Two plus-minus contact terminal pairs 5a, 5b, 6a, 6b are located in the coupling part 3 connected to the blocks A, B and arranged to be tapped from the outside of the housing 2.

Figure 2:
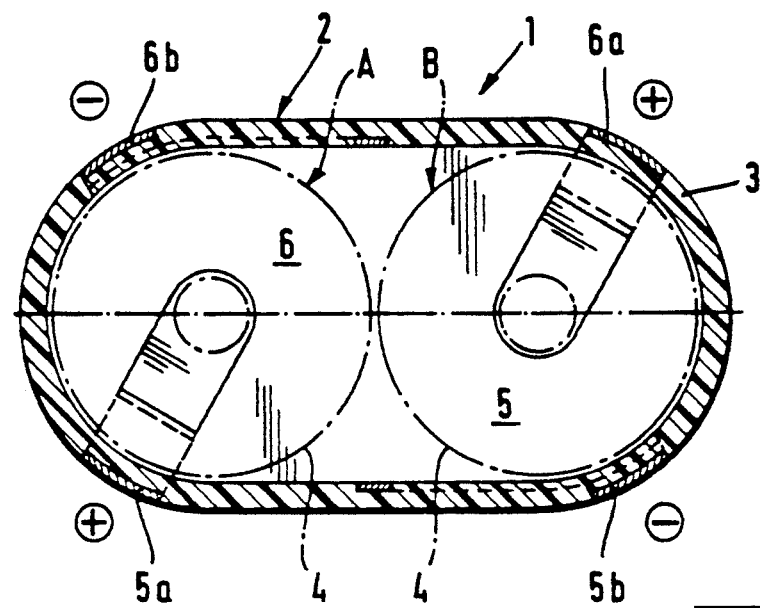
FIG. 2 is a cross-sectional view of the storage battery shown in FIG. 1 taken along the line II—II.

FIG. 2 shows the storage battery 1 with the two plus-minus contact terminal pairs 5a, 5b, 6a, 6b arranged symmetrically opposite one another with each plus-minus contact terminal pair 5a, 5b, 6a, 6b disposed in a separate partial area 5, 6 of the cross-sectional area of the housing extending transversely of its axis. The number of individual cells 4 in each block A, B can be equal or different. In each case the sum of the voltages of blocks A, B equals the voltage of the storage battery 1.

As an example, the storage battery 1 has two 12 V blocks. Such a storage battery can power electrically driven tools to be operated at 12 or 24 V.

By means of internal regulation or control electronics housed in the electrically driven tool the energy can be utilized in series. As a result, a voltage of 24 V is available. If both blocks are electrically wired in parallel, a voltage of 12 V but at twice the capacity is available.

Figure 3:
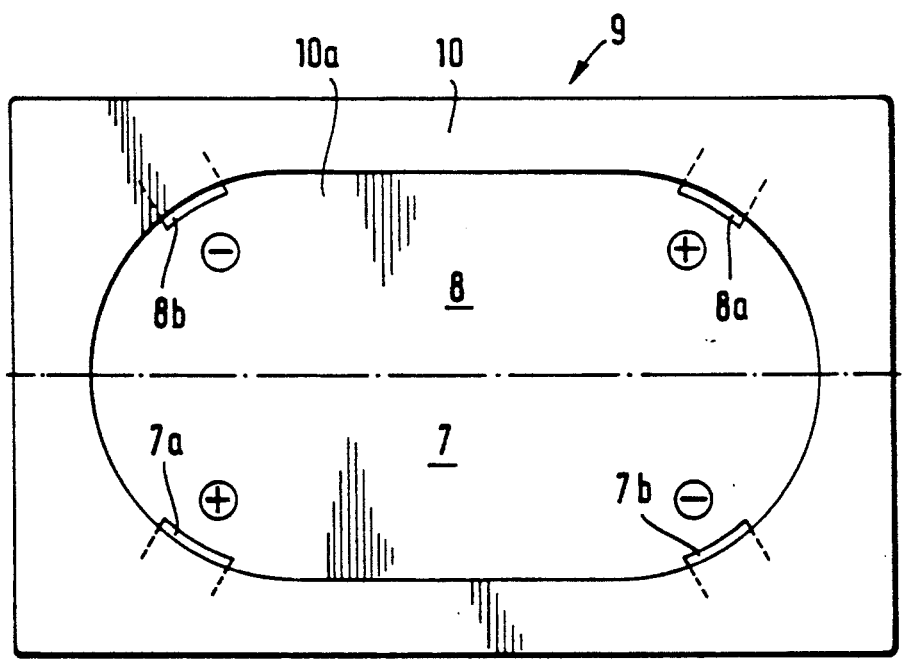
FIG. 3 is a plan view of a charging device having a coupling part with a charging recess having two plus-minus contact terminal pairs.

FIG. 3 displays a charging recess in a charging device containing a coupling part 10a, with its cross-sectional surface subdivided into two symmetrical and equal partial areas with one plus-minus contact terminal pair 7a, 7b, 8a, 8b assigned to each partial area 7, 8. The device 9 required for the charging apparatus can provide a voltage of 12 V. Due to the low charging voltage of 12 V the components of the device 9 can be designed for 12 V. Accordingly, the charging device 9 can be economically manufactured, because the individual components cost considerably less than the components for a charging device 9 designed for a charging voltage of 24 V.

When the charging process for the 12 V block A in a 12 V charging device is completed, the other 12 V block B is charged.

The completion of the charging process of the first block A can be indicated by a signal, for instance a lamp or a sound signal. By turning the storage battery 1 manually in the circumferential direction, that is, transversely of the axial direction, the next block B can be placed in position for charging.

The charging device 9 can be arranged so that plus-minus contact terminal pairs 7a, 7b, 8a, 8b are disposed in the charging recess 10a of the coupling part 10 with the quantity of the contact terminal pairs in the charging device 9 being equal to the number of contact terminal pairs 5a, 5b, 6a, 6b located in the housing 2 of the storage battery 1. In such an arrangement of a more expensive charging device 9 it is unnecessary to turn the battery manually in the circumferential direction during the charging process. The blocks A, B in electrical connection with the individual contact pairs 5a, 5b, 6a, 6b are charged plus-minus terminal consecutively by means of an internal electronic charging arrangement.

Accordingly, a 24 V storage battery, not illustrated, can be divided into three blocks, whereby the charging device provides a charging voltage of only 8 V. By appropriate electric connections in series of the individual blocks in the electrically-driven tool, a voltage of 24 V is available.

Figure 4:
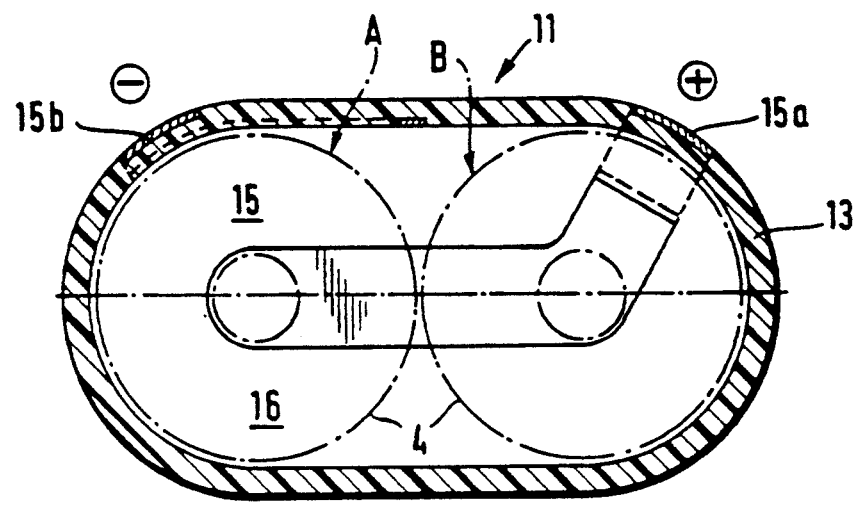
FIG. 4 is a sectional view corresponding to the sectional view in FIG. 2 in a storage battery with one plus-minus contact terminal pair.

In FIG. 4 the cross-sectional area of a coupling part 13 of a storage battery 11 is divided symmetrically into two equal partial areas 15, 16 with one plus-minus contact terminal pair 15a, 15b. In this embodiment, the plus-minus terminal contact pair 15a, 15b is disposed in the partial area 15. Each individual cell of the storage battery 11 has a voltage of approximately 1.2 V when used in electrically driven tools having an energy of 1.2 to 4 Ampere hours.

Figure 5:
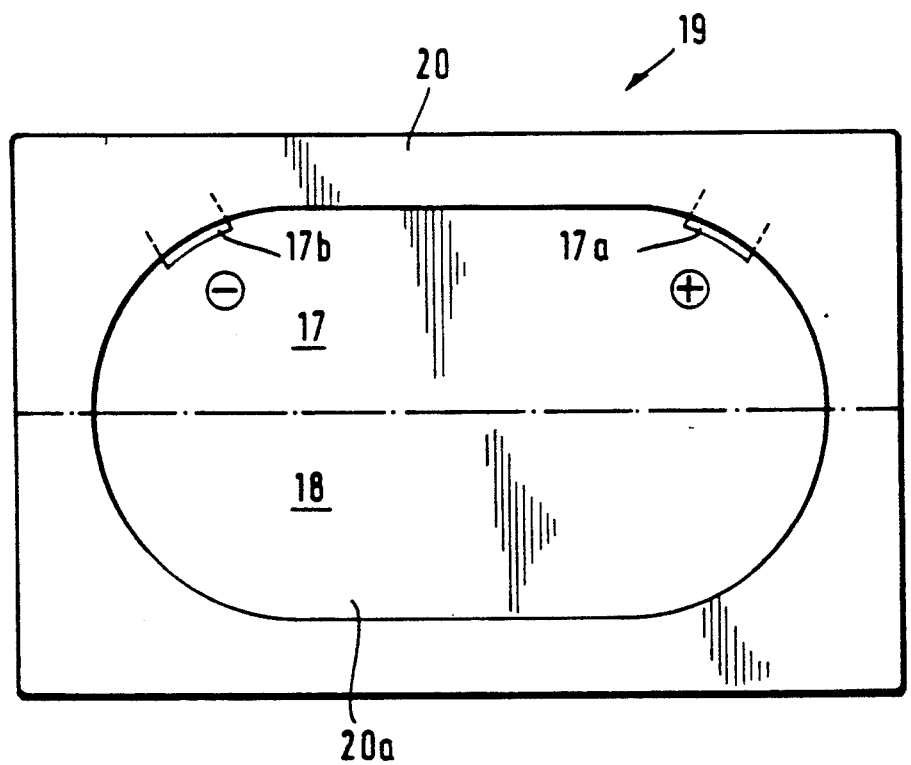
FIG. 5 is a plan view similar to that in FIG. 3, however, where the charging recess of the charging device has one plus-minus contact terminal pair.

In FIG. 5 a charging device 19 is shown with a charging section 20 containing a coupling part 20a with its cross-sectional area divided into two symmetrically equal partial areas 17, 18 with a plus-minus contact terminal pair 17a, 17b located in one of the partial areas 17. The charging device 19 has a housing 20 characterized by high stability.

The charging device 9 has a circuit part with a transformer and a rectifier portion for producing a DC voltage as a supply voltage.

While specific embodiments of the invention have been shown and described in detail to illustrate the inventive principles, it will be understood that the invention may be embodied otherwise without departing from such principles.

We claim:

1. A storage battery, comprising:
   a housing having a central axis;
   at least one block located in said housing and having an axis, which extends parallel to the central axis of the housing, and at least one individual cell; and
   a coupling part located at one end of said housing and having an outer end surface and at least one pair of plus-minus contact terminals associated with said at least one individual cell and accessible at said outer end surface;
   wherein said coupling part extends transverse to the central axis of said housing, wherein said outer end surface is divided at least into two equal areas, and further wherein the at least one pair of contact terminals is accessible at one of said at least two equal surface areas.

2. The storage battery of claim 1, wherein said coupling part has two pairs of plus-minus contact terminals, and wherein each pair of contact terminals is accessible at a respective one of said at least two equal areas.

3. The storage battery of claim 2, wherein the contact terminals of said two pairs of contact terminals are arranged symmetrically with respect to an axis of symmetry, which divides said surface area into said at least two equal areas, and with respect to a line, which extends perpendicular to the axis of symmetry and passes through a center of the axis of symmetry.

4. A charging device for a storage battery including a housing and at least one block located in the housing and comprising at least one individual cell, said charging device comprising a coupling part having a surface area, which is divided into at least two equal parts, and at least one pair of plus-minus contact terminals,
   wherein at least one of said at least one pair of contact terminals is accessible at least at one of said at least two equal parts.

5. The charging device of claim 4, wherein said coupling part has two pairs of plus-minus contact terminals, and wherein each pair of contact terminals is accessible at a respective one of said at least two equal areas.

6. The charging device of claim 5, wherein the terminal contacts of said two pairs of contact terminals are arranged symmetrically with respect to an axis of symmetry, which divides said surface area into said at least two equal areas, and with respect to a line, which extends perpendicular to the axis of symmetry and passes through a center of the axis of symmetry.

* * * * *